United States Patent
Horikoshi et al.

(10) Patent No.: US 6,939,154 B2
(45) Date of Patent: Sep. 6, 2005

(54) SHOCK ABSORBING CONNECTOR (75) Inventors: Seita Horikoshi, Zama (JP); Takayuki Morino, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 138 days.

(21) Appl. No.: 10/606,696

(22) Filed: Jun. 26, 2003

(65) Prior Publication Data

US 2005/0048824 A1 Mar. 3, 2005

(30) Foreign Application Priority Data

Aug. 6, 2002 (JP) ........................................ 2002-229086

(51) Int. Cl.[7] .............................................. H01R 13/629
(52) U.S. Cl. ........................................ 439/247; 439/79
(58) Field of Search ..................... 439/79–80, 246–248

(56) References Cited

U.S. PATENT DOCUMENTS

| 4,722,691 A | * | 2/1988 | Gladd et al. .................. 439/79 |
| 4,810,215 A | * | 3/1989 | Kaneko ........................ 439/845 |
| 6,039,590 A | * | 3/2000 | Kunishi ....................... 439/247 |

* cited by examiner

Primary Examiner—Truc Nguyen
(74) Attorney, Agent, or Firm—Kunzler & Associates (57) ABSTRACT

A connector is provided to reduce the transmission of shock from a housing to a HD via a connector in a notebook computer when the housing is dropped or hits something. The connector has a lower connector portion that is fixed to a print-circuit board and a guide axis, and an upper connector portion that is positioned above the lower connector portion with a vertical gap between itself and the lower connector portion to be slidable along the guide axis. To and from the front side of the upper connector portion, the terminal pins of the HD are inserted and pulled out. Upper ends of electric connection pins for the upper and lower rows can be inserted into pin insertion holes on the upper connector portion to be connected to the terminals of the HD, middle portion of the connection pins have U-shaped resilient portions, and lower ends protrude downward to the lower connector portion and are connected to the wires of the print-circuit board.

11 Claims, 8 Drawing Sheets

SHOCK ABSORBING CONNECTOR

BACKGROUND OF THE INVENTION

The present invention relates to a connector unit provided in a notebook computer. More specifically, it relates to a connector unit that reduces a shock due to rebound applied to an electric unit connected thereto.

A notebook computer has a hard disk unit provided in a housing, and typically, the hard disk unit is removably connected to a connector of the notebook computer. In conventional notebook computers, (a) a hard disk unit connector is fixed to an electric circuit board by soldering, or (b) the hard disk unit connector is contained in the housing without being fixed and has terminals connected to an electric circuit board via a flexible cable.

In the case (a), if the shock transmission path of the notebook computer from the housing to the hard disk unit via the connector is a perfect rigid body, when the notebook computer drops and hits the floor, for example, the shock applied to the hard disk unit is less than the shock applied to the housing. However, since the shock transmission path of typical notebook computers is not the perfect rigid body, the hard disk unit is momentarily subjected to a shock load higher than that applied to the housing, because of rebound. This leads to a read/write error of the hard disk unit. In the case (b), the shock applied to the hard disk unit is not increased due to rebound. However, since the connector is not fixed at a certain position, it is difficult to connect the hard disk unit to the connector by pushing the unit into the housing through an opening in the side of the housing. Thus, the housing has to be opened to connect the hard disk unit to the connector, and thus, the operation of attaching or removing the hard disk unit is complicated. In addition, the hard disk unit is not stable at its end near the connector, and the flexible cable occupies a significant space in the housing, and thus, tends to hinder down-sizing of the housing.

A purpose of the invention is to provide a connector unit capable of reducing a rebound shock applied to an electric unit connected thereto without using a flexible cable.

SUMMARY OF THE INVENTION

A connector unit according to the invention comprises: a connector member removably connected to an electric unit contained in a housing; and a plurality of electric connection pins that supports the connector member over a housing side member with a space therebetween, have resilient portions in their middle portion, form respective terminals of the connector member at one end and are connected to respective terminals of the housing side member at the other end.

Another connector unit according to the invention comprises: a first connector portion removably connected to an electric unit; a second connector portion; a resilient member that supports the first connector portion over the second connector portion with a space therebetween; and a plurality of electric connection pins that have middle portions for allowing relative displacement of the first and second connector portions and form terminals of the first and second connector portions at either ends.

This purpose is accomplished by a combination of features as defined in independent claims in the scope of claims. Also, the dependent terms define preferable examples of the invention.

The above summary of the invention does not enumerate all of the necessary features for the present invention, but some combinations of these features may also be inventive features.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which the preferred embodiments of the present invention are shown, it is to be understood at the outset of the description which follows that persons of skill in the appropriate arts may modify the invention here described while still achieving the favorable results of this invention. These embodiments are not intended to limit the invention, the scope of which is determined by the Claims, and all combinations of the features described in the embodiments are not necessarily fundamental for the solution of the invention.

Accordingly, the description which follows is to be understood as being a broad, teaching disclosure directed to persons of skill in the appropriate arts, and not as limiting upon the present invention.

A first connector unit according to a first embodiment comprises: a connector member removably connected to an electric unit contained in a housing; and a plurality of electric connection pins that supports the connector member over a housing side member with a space therebetween, have resilient portions in their middle portion, form respective terminals of the connector member at one end and are connected to respective terminals of the housing side member at the other end. The components of the first connector unit correspond to components of a connector 20, a practical example, described later, as follows: the left is the components of the first connector unit, and the right is the components of the connector 20; the housing corresponds to a housing 15; the electric unit corresponds to an HD (hard disk unit); the connector member corresponds to an upper connector portion 38; the housing side member corresponds to a printed circuit board 27; and the electric connection pins correspond to electric connection pins 53 and 54 for upper and lower rows. In the first connector unit, a component corresponding to a lower connector portion 39 of the connector 20 can be omitted. That is, in the first connector unit, the electric connection pins are connected to the housing side member at their ends without the component corresponding to the lower connector portion 39. The electric connection pins are formed by die-cutting a metal plate, for example, and has a predetermined rigidity in a direction in which it supports the connector member over the housing side member. The electric connection pins are preferably bent at their longitudinal middle portions in a thickness direction, and the bent portions form resilient portions.

A second connector unit according to a second embodiment comprises: a first connector portion removably connected to an electric unit; a second connector portion; a resilient member that supports the first connector portion over the second connector portion with a space therebetween; and a plurality of electric connection pins that have middle portions for allowing relative displacement of the first and second connector portions and form terminals of the first and second connector portions at either ends. The components of the second connector unit correspond to components of the connector 20, a practical example, described later, as follows: the left is the components of the second connector unit, and the right is the components of the connector 20; the electric unit corresponds to the HD (hard disk unit); the first connector portion corresponds to the upper connector portion 38; the second connector portion corresponds to the lower connector portion 39; the resilient member corresponds to the electric connection pins 53 and 54 for upper and lower rows; and the electric connection pins correspond to the electric connection pins 53 and 54 for upper and lower rows.

In the second connector unit, the resilient member may be provided separately from the electric connection pins, or the electric connection pins may serve also as the resilient members. The resilient member may be provided separately from the electric connection pins if the electric connection pins cannot provide a sufficient resilient force by itself or if the electric connection pins can provide little resilient force because of their material, structure or shape although allowing a relative displacement of the first and second connector portions (for example, in the case where it is a linear member).

Preferably, in the second connector unit, the middle portions of the electric connection pins are resilient deformed portions serving also as the resilient members. In addition, each of the electric connection pins is composed of a metal plate. The metal plate has a curved portion bent in a thickness direction, and the curved portion serves as the resilient deformed portion.

A preferred structure of the second connector unit is as follows. Each of the first and second connector portions has a plurality of terminals arranged in two rows, the first connector portion has the terminals in one row and the terminals in the other row aligned in a column direction, and the second connector portion has terminals in one row and the terminals in the other rows displaced from each other in a column direction by a half pitch, where a distance between two terminals in each row is defined as one pitch. The electric connection pins include first electric connection pins constituting the terminals in one row of the first connector portion and the terminals in one row of the second connector portion and second electric connection pins constituting the terminals in the other row of the first connector portion and the terminals in the other row of the second connector portion. The middle portions of the first and second electric connection pins are displaced with respect to the positions of the terminals of the first connector portion by a quarter of the pitch in the opposite directions along the rows of the terminals. Thus, the distance between the terminals of the first and second connector portions can be reduced while preventing the first and second electric connection pins from being in contact with each other, and therefore, the first and second connector portions can be reduced in size.

In the second connector unit, preferably, the curved portion of the first electric connection pin and the curved portion of the second electric connection pin are displaced from each other in a direction in which the electric unit is attached to or removed from the first connector portion. Since the curved portion, which is the resilient portion, of the first electric connection pin and the curved portion, which is the resilient portion, of the second electric connection pin are displaced from each other in a direction in which the electric unit is attached to or removed from the first connector portion, the resilient force in the direction in which the first and second connectors face to each other is uniform in the direction of insertion or removal of the electric unit.

Preferably, the second connector unit has a guide axis. The guide axis extends in a direction in which the first connector portion and the second connector portion face to each other, is fixed to the second connector portion and guides the first connector portion in a direction of extension thereof in such a manner that the first connector portion is capable of being displaced with respect to the guide axis. Furthermore, the guide axis has an end part protruding from the first connector portion, and the end part is fitted into a predetermined hole or groove in a guide rail, which guides the electric unit toward the first connector portion, to position the guide rail and the first connector portion. Typically, the shock increased by rebound and applied to the electric unit via the connector is the maximum in the direction in which the first and second connector portions face to each other. The guide axis allows a relative displacement of the first and second connector portions in that direction. On the other hand, the guide axis has an adequate rigidity in a direction perpendicular to that direction. If the direction in which the guide axis exhibits rigidity is selected to correspond with the direction in which the electric unit is connected to the first connector portion, the first connector portion is fixed in position in the direction in which the electric unit is connected thereto when the second connector portion of the second connector unit is fixed at a predetermined position. Therefore, the operator or user can connect or disconnect the electric unit to or from the first connector portion without having to grasp the first connector portion.

The electric unit removably connected to the first connector portion of the second connector unit may be a hard disk unit disposed in the housing shared with the second connector unit, for example. For example, the hard disk unit may be one removably provided in a portable computer, the second connector portion may be a printed circuit board fixed in the housing of the portable computer. The portable computer may be a notebook personal computer.

Figure 1:
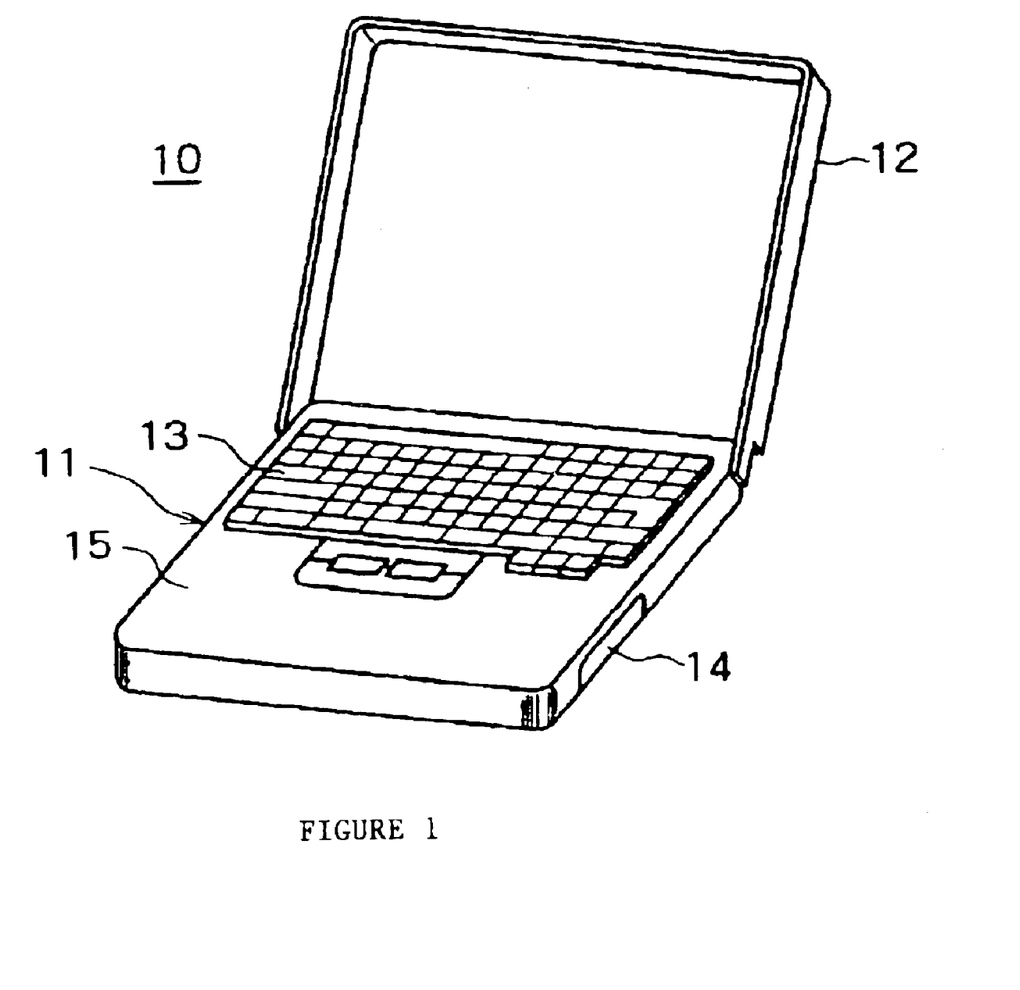
FIG. 1 is a perspective view of a notebook computer, which is opened.

FIG. 1 is a perspective view of a notebook computer 10, which is opened. The notebook computer 10 comprises a main system 11 and a liquid crystal display 12 capable of being closed over the main system 11, and a keyboard 13 is provided on an upper surface of the main system 11 which mates with the liquid crystal display 12 when in the closed position. An HD cover 14 is exposed on a side face of a housing 15 of the main system 11. The housing 15 has an opening at a position where the HD cover 14 is to be attached. The HD cover 14 is removably coupled to an HD main unit 23 (FIG. 2) described later. The HD cover 14 is removably fixed to the housing 15 of the main system 11 by means of a bolt (not shown), and when it is fixed thereto, it is apparently integrated with the housing 15.

Figure 2:
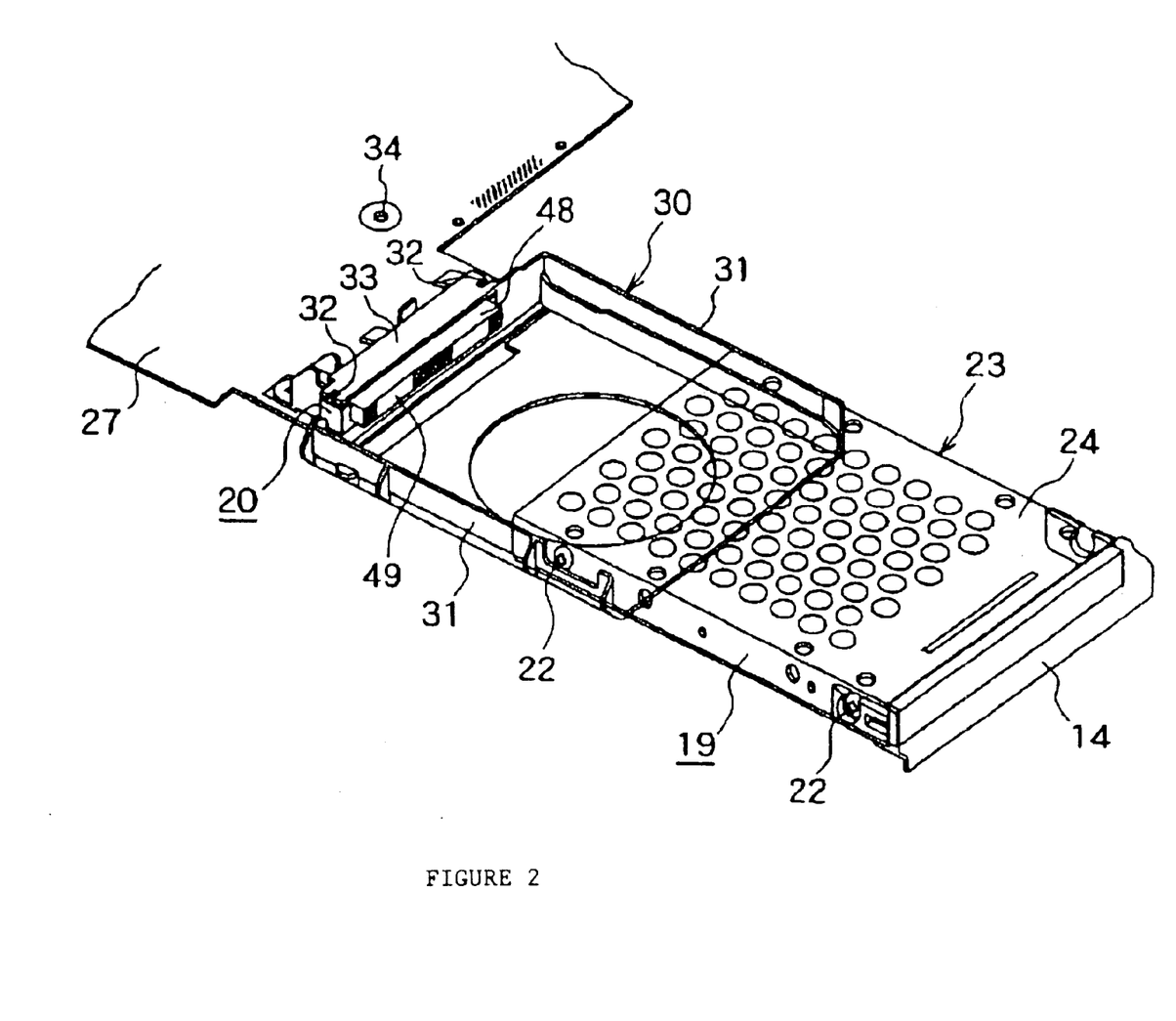
FIG. 2 is a perspective view showing a positional relationship among an HD, a connector and the like in a main system.

FIG. 2 is a perspective view showing a positional relationship among an HD 19, a connector 20 and the like in the main system 11. The HD 19 comprises the HD cover 14 and the HD main unit 23, which can be appropriately replaced with another and has the HD cover 14 removably fixed thereto at the end close to the outside. The HD cover 14 is separated from the HD main unit 23 by a predetermined distance at parts other than the side edges thereof, so that it can be displaced to a certain extent relative to the HD main unit 23. Thus, the transmission of shock from the HD cover 14 to the HD main unit 23 is reduced. In order to prevent an internal structure of the HD from being exposed to the outside, the HD main unit 23 has a punched bracket 24 for covering the HD internal structure. The punched bracket 24 is removably fixed to a housing containing the HD internal structure by means of a plurality of screws 22. The connector 20 is attached to a predetermined edge of a printed circuit board 27 on which various electric elements including ICs are mounted. The printed circuit board 27 is perforated with a plurality of insertion holes 34 appropriately distributed, and screws (not shown) are inserted into the insertion holes 34 to engage with their respective protrusions on a bottom wall of the housing 15 (FIG. 1), thereby fixing the printed circuit board 27 to the bottom wall of the housing 15. An HD containing case 30 is opened upward, defines a space capable of accommodating the HD 19 therein, and has a pair of guide rails 31 and an extension portion 33 extending toward the connector 20. The paired guide rails 31 allow the sides of the HD 19 to slide along them to guide the HD 19 toward or apart from the connector 20. The extension portion 33 is mounted on the upper surface of the connector 20 and has its recess engaged with an upward projection 32 on the upper surface. Engagement of the recess of the extension portion 33 with the upward projection 32 positions horizontally the HD containing case 30 with respect to the connector 20.

Figure 3:
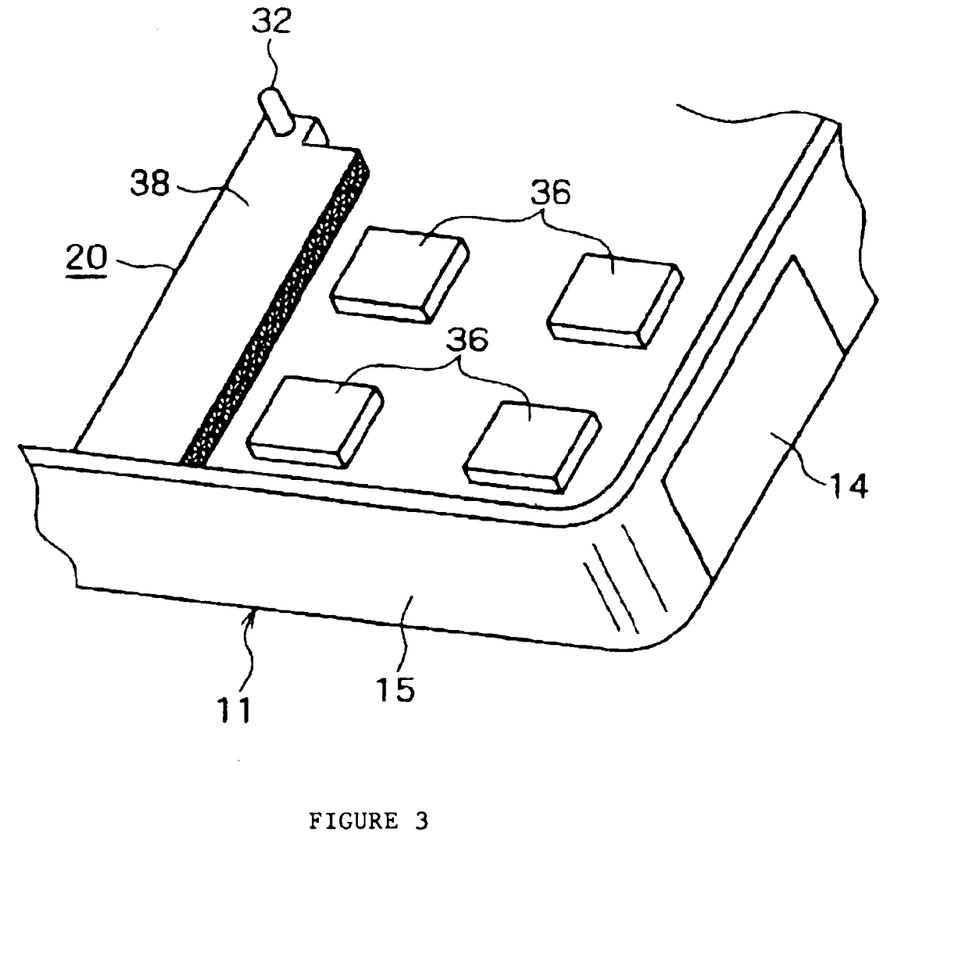
FIG. 3 shows a structure below the HD disposed in the main system.

FIG. 3 shows a structure below the HD 19 disposed in the main system 11. In FIG. 3, the inside of the housing 15 is shown with the HD containing case 30 being removed. Four rubber pieces 36, which serves as resilient bodies, are disposed at vertexes of a predetermined rectangle in an area below the HD containing case 30 and fixed to the upper surface of the bottom wall of the housing 15 at their bottom faces. When the HD cover 14 is stored in the HD containing case 30 and connected to the connector 20, these rubber pieces 36 are in contact with the lower surface of the HD containing case 30 at their upper surface, and supports the HD cover 14 while allowing a horizontal relative displacement of the HD cover 14. The rubber pieces 36 serves to reduce vertical vibration of the HD 19 when a vertical shock is applied to the housing 15.

Figure 4:
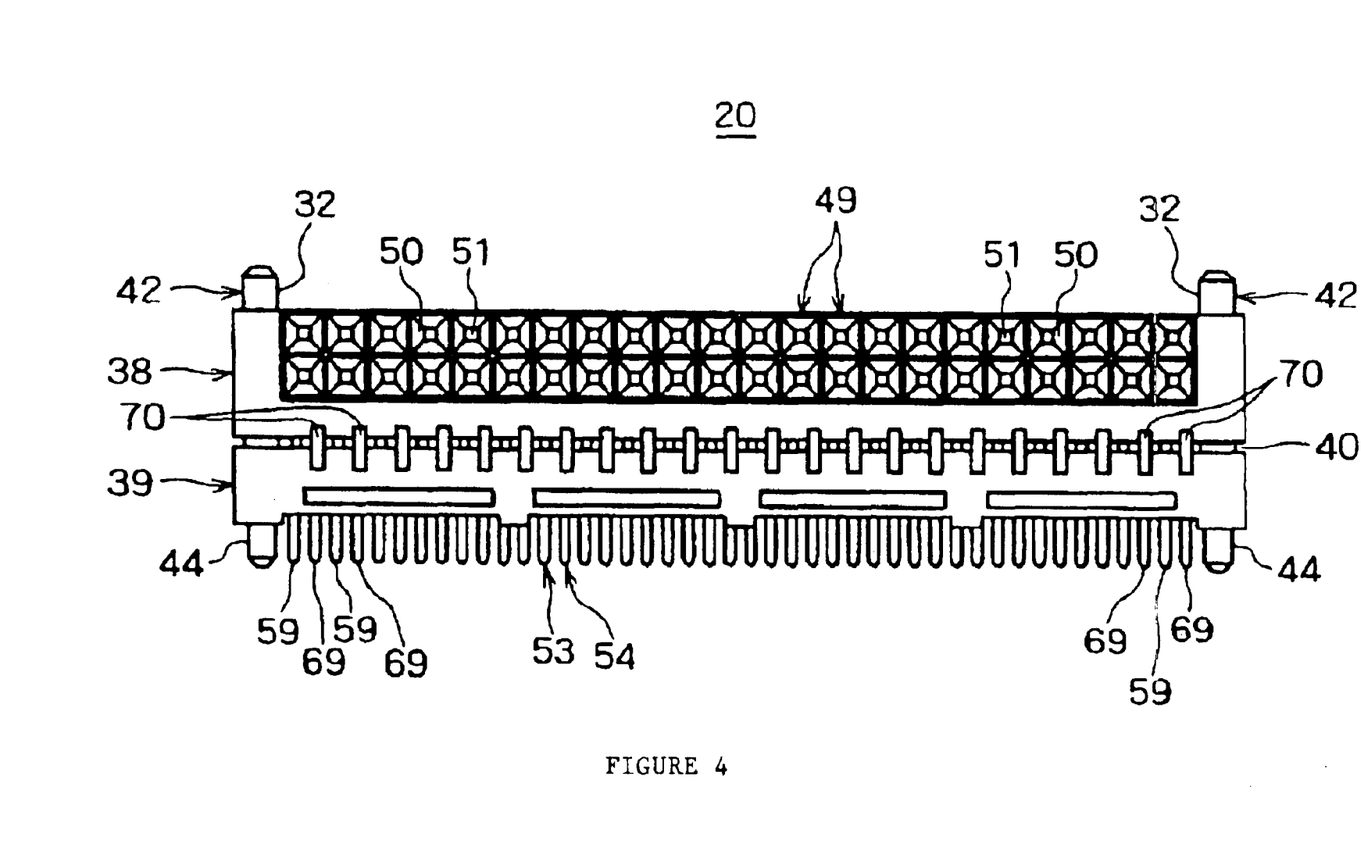
FIG. 4 is a front view of the connector.
Figure 5:
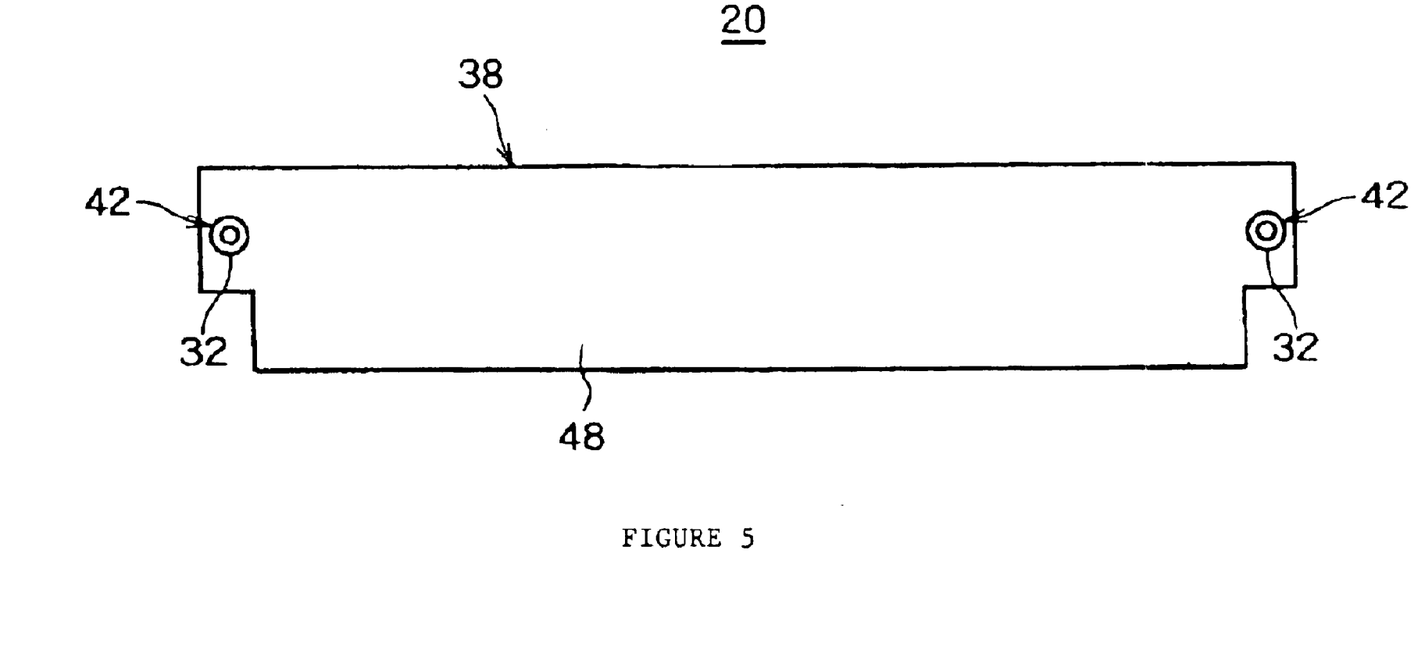
FIG. 5 is a plan view of the connector.
Figure 6:
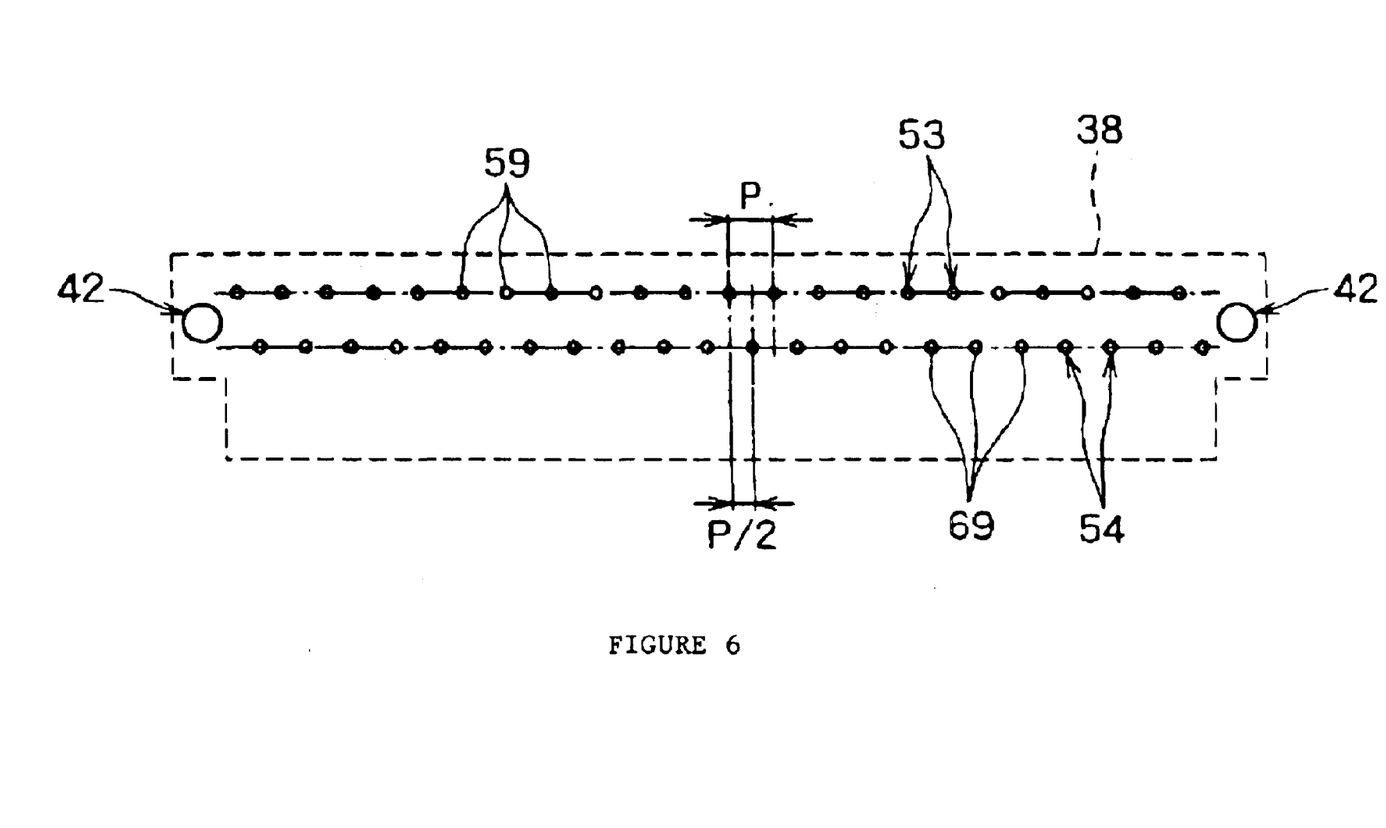
FIG. 6 shows an arrangement of lower ends of electric connection pins at a lower surface of a lower connector portion, viewed from above the connector in FIG. 5 and an upper connector portion and the lower connector portion being shown in perspective.
Figure 7:
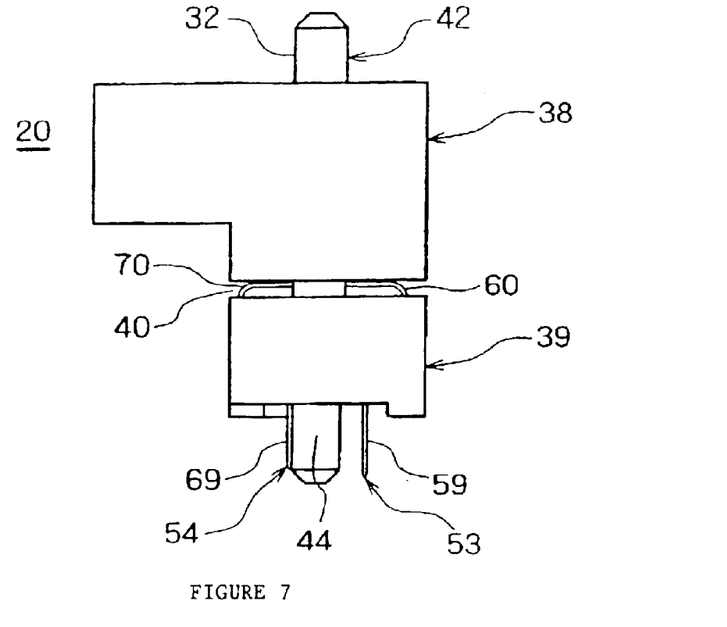
FIG. 7 is a right side view of the connector.

FIGS. 4 and 5 are a front view and a plan view of the connector 20, respectively. FIG. 6 shows an arrangement of electric connection pins at the lower surface of the lower connector portion 39, viewed from above the connector 20 in FIG. 5 and the upper connector portion 38 and the lower connector portion 39 being shown in perspective. FIG. 7 is a right side view of the connector 20. The connector 20 comprises the upper connector portion 38 and the lower connector portion 39 with a vertical gap 40 therebetween. Paired guide axes 42 are disposed at the longitudinal ends of the connector 20 and vertically penetrate the end parts of the upper connector portion 38 and the lower connector portion 39. The lower connector portion 39 is fixed to the guide axes 42, and the upper connector portion 38 can slide along the guide axes 42 and is vertically guided by the guide axes 42. Each of the guide axes 42 has an upward protrusion 32 protruding upwardly from the upper surface of the upper connector portion 38 and a downward protrusion 44 protruding downwardly from the lower surface of the lower connector portion 39. The upper connector portion 38 has a front extension 48 protruding toward the HD 19 (FIG. 2). Here, for convenience of explanation, it is assumed that the side of the connector 20 near the HD 19 is the front side and the side thereof opposite to the HD 19 is the rear side. In the upper connector portion 38, a plurality of pin insertion holes 49 are vertically arranged in two rows, extend horizontally in the front-and-rear direction, and open at the front surface of the front extension 48. In the shown connector 20, each row has 22 pin insertion holes 49. Each of the pin insertion holes 49 has a pin-tip guide section 50 of a larger diameter located at the opening and a pin-contact section 51 of a smaller diameter located inwardly. The arrangement of the pin insertion holes 49 corresponds with the arrangement of the terminal pins (not shown) of the HD 19. When the HD 19 is pushed inwardly along the guide rails 31 for connecting the HD 19 to the upper connector portion 38, tips of the electric connection pins of the HD 19 are inserted into the pin-tip guide sections 50 of their associated pin insertion holes 49. If the HD 19 is further pushed inwardly, the tips of the electric connection pins of the HD 19 are guided by the pin-tip guide sections 50 toward the centers, that is, toward the pin-contact sections 51 and finally fitted into the pin-contact sections 51. In the pin-contact sections 51, the electric connection pins of the HD 19 are in intimate contact with the electric connection pins 53 and 54 for upper and lower rows. The electric connection pins 53 and 54 for the upper and lower rows are associated with the pin insertion holes 49 in the upper and lower rows of the upper connector portion 38, respectively. The pin insertion holes 49 in the upper row and the pin insertion holes 49 in the lower row are aligned in the column direction.

In FIG. 6, the row of the lower ends 59 of the electric connection pins 53 for the upper row and the row of the lower ends 69 of the electric connection pins 54 for the lower row are located horizontally and extend parallel to each other. As can be seen from FIG. 4, the lower ends 59, 69 protrude downwardly from the lower surface of the lower connector portion 39 by a predetermined distance, as with the electric connection pins 54 for the lower row of the guide axis 42. The lower ends 59, 69 are inserted into their associated holes in the printed circuit board 27 until the lower end of the lower connector portion 39 is brought into contact with the upper surface of the printed circuit board 27, and then, fixed to the printed circuit board 27 by soldering. The lower ends 59, 69 are electrically connected to a predetermined wiring on the printed circuit board 27 when they are inserted into the associated holes in the printed circuit board 27 and soldered thereto.

Figure 8:
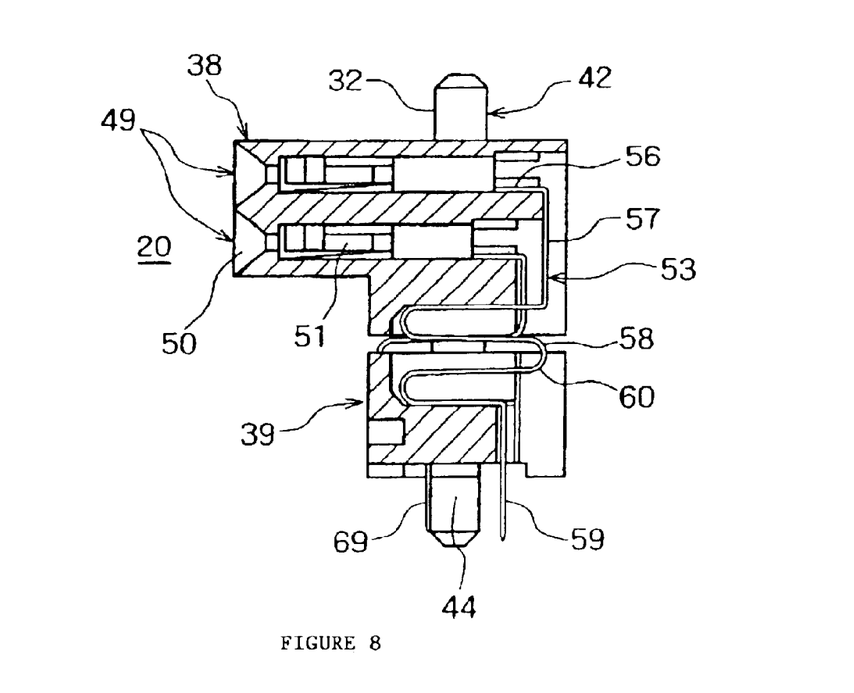
FIG. 8 shows a vertical cross section of the connector and a vertical shape of an electric connection pin for an upper row.
Figure 9:
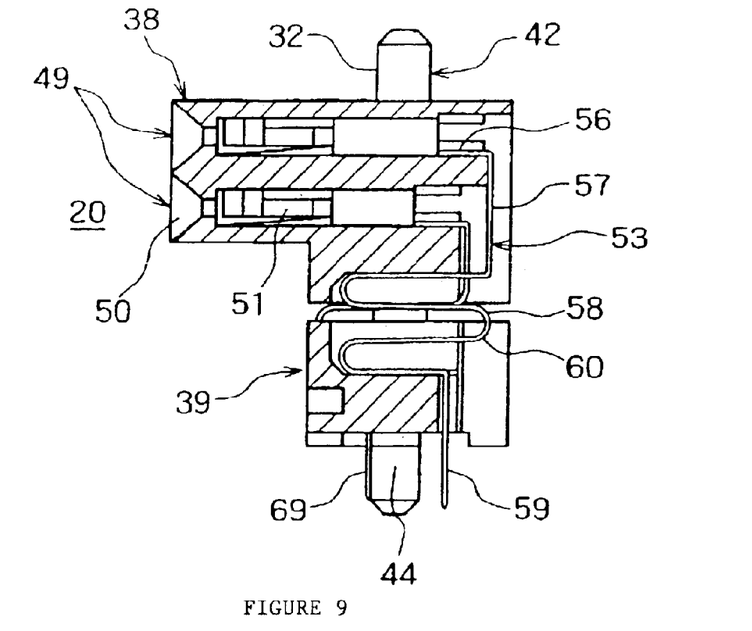
FIG. 9 shows a vertical cross section of the connector and a vertical shape of an electric connection pin for a lower row.
Figure 10:
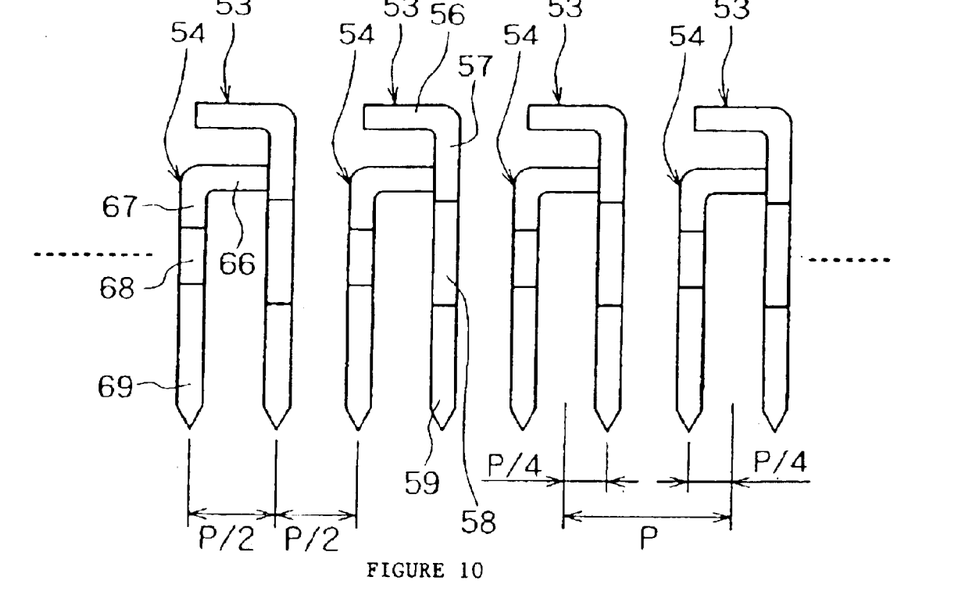
FIG. 10 is a rear view of a part of the connector.

FIGS. 8 and 9 each shows a vertical cross section of the connector 20 and vertical shapes of the electric connection pins 53, 54 for the upper and lower rows. FIG. 10 is a rear view of a part of the connector 20. The electric connection pins 53 and 54 for the upper and lower rows are formed by die-cutting a plate-like material and bending the die-cut plate in the thickness direction and have U-shaped resilient portions 60 and 70, respectively, in their vertical middle portions. The U-shaped resilient portions 60 and 70 allow the electric connection pins 53 and 54 for the upper and lower rows to produce a high resilient force in the vertical direction. Legs of the U-shaped resilient portions 60 and 70 extend along in the horizontal direction, and therefore, the electric connection pins 53 and 54 for the upper and lower rows can produce a predetermined resilient force also in the horizontal direction, although the resilient force is weaker than that in the vertical direction. However, since the relative displacement of the upper connector portion 38 and the lower connector portion 39 is limited to the vertical direction by the guide axis 42, only the vertical resilient force of the electric connection pins 53 and 54 for the upper and lower rows is used. One electric connection pin 53 for the upper row has an upper end section 56 which is inserted, from its rear end, into the pin-contact section 51 of the associated pin insertion hole 49 in the upper row in the upper connector portion 38, a vertical section 57 depending from the upper end section 56, a middle bent section 58 extending from the lower end of the vertical section 57, and a lower end section 59 depending from the lower end of the middle bent section 58. The U-shaped resilient portion 60 is formed in the middle bent section 58, and its convex section is oriented rearward. One electric connection pin 54 for the lower row has an upper end section 66 which is inserted, from its rear end, into the pin-contact section 51 of the associated pin insertion hole 49 in the lower row in the upper connector portion 38, a vertical section 67 depending from the upper end section 66, a middle bent section 68 extending from the lower end of the vertical section 67, and a lower end section 69 depending from the lower end of the middle bent section 68. The U-shaped resilient portion 70 is formed in the middle bent section 68, and its convex section is oriented frontward. The lateral direction in FIG. 10 is defined as the width direction of the electric connection pins 53, 54 for the upper and lower rows, and the distance between two of the pin insertion holes 49 in the row direction is defined as a pitch (P). As can be seen from FIG. 10, the electric connection pins 53 for the upper rows and the electric connection pins 54 for the lower row are displaced from each other by P/2 except for the upper end sections thereof. In addition, although the vertical sections 57 of the electric connection pins 53 for the upper row and the upper end sections 66 of the electric connection pins 54 for the lower row overlaps each other in the vertical direction, they are displaced from each other in the horizontal direction as can be seen from FIG. 8 or 9. Thus, the electric connection pins 53 and 54 for the upper and lower rows are prevented from being electrically connected to each other. Each of the electric connection pins 53 for the upper row has three U-shaped curved portions in the middle bent section 58, the uppermost and lowermost U-shaped resilient portions have one leg thereof brought into surface-contact with the upper connector portion 38 and the lower connector portion 39, respectively, and the middle U-shaped resilient portion 60 is dominantly responsible for the vertical resilient force of the electric connection pin 53 for the upper row. The U-shaped resilient portions 60 of the electric connection pins 53 for the upper row and the U-shaped resilient portions 70 of the electric connection pins 54 for the lower row are located on the rear end side and the front end side of the lower connector portion 39, respectively, and thus, the vertical resilient force of the connector 20 is uniform in the horizontal direction.

When the HD 19 is removed from the housing 15 for replacement or the like, the user unscrews the screw (not shown) that fixes the HD cover 14 to the housing 15, grasps the HD cover 14, and applies force to the HD cover 14 in the direction of drawing the HD 19 out of the housing 15. Since the upper connector portion 38 and the lower connector portion 39 of the connector 20 are fixed to the printed circuit board 27 by the pair of guide axes 42, an adequate amount of force exerted in the direction of removal of the HD 19 from the housing 15 allows the electric connection pins of the HD 19 to be drawn out of the pin insertion holes 49 of the upper connector portion 38 without hindrance, and the HD 19 is separated from the upper connector portion 38, guided by the guide rails 31, and then drawn out of the housing 15. When the HD 19 is to be installed into the housing 15, the leading edge of the HD 19 is inserted into the housing 15 from the opening formed in the side of the housing, and the HD cover 14 is pushed into the housing. Then, the HD 19 is moved inwardly along the guide rails 31, and the electric connection pins at the leading edge of the HD 19 enter into the pin-tip guide sections 50 of the pin insertion holes 49 of the upper connector portion 38 of the connector 20. Since the connector 20 is fixed to the printed circuit board 27 by the guide axes 42, force exerted in the direction of insertion of the HD 19 into the housing 15, prevents the upper connector portion 38 from moving during an insertion event, and the terminal pins of the HD 19 are guided by the pin-tip guide sections 50 of the pin insertion holes 49 and deeply fitted into the pin-contact sections 51 thereof to be electrically connected to the electric connection pins 53 and 54 for the upper and lower rows.

During use of the notebook computer 10, that is, during operation of the HD 19, a shock may be applied to the housing 15. The shock applied to the housing 15, such as a shock resulting from the notebook computer 10 dropping from a certain height and hitting the floor or the like, is often applied to the housing 15 in its vertical direction, that is, in a direction in which the guide axes 42 of the connector 20 extend. Since the printed circuit board 27 is fixed to the housing 15, the shock applied to the housing 15 is to be transmitted from the printed circuit board 27 to the HD 19 via the connector 20. However, although the lower connector portion 39 is fixed to the printed circuit board 27, the upper connector portion 38 can move along the guide axes 42 within a predetermined distance, and the electric connection pins 53 and 54 for the upper and lower rows produce a resilient force as the upper connector portion 38 moves relative to the guide axes 42 along the same. Therefore, the shock applied from the printed circuit board 27 to the upper connector portion 38 is adequately decreased in peak value, although it is increased in duration. As a result, the head in the HD 19 can be prevented from colliding with the disk to cause a data read/write error.

In the drawings and specifications there has been set forth a preferred embodiment of the invention and, although specific terms are used, the description thus given uses terminology in a generic and descriptive sense only and not for purposes of limitation.

While the present invention has been described with respect to the embodiment of the invention, the technical scope of the present invention is not limited to the described embodiment. Various changes and modifications may be made in the described embodiment. As is apparent from the description in the appended Claims, modes of the present invention characterized by such changes and modifications are also included in the technical scope of the invention.

We claim as our invention:

1. A connector, comprising:
    a connector member that is removably connected to an electric unit contained in a housing;
    a plurality of electric connection pins which support said connector member over a housing side member with a space therebetween, which have resilient portions in their middle portion that produce a strong resilient force in the vertical direction and a weaker resilient force in the horizontal direction, and which form respective terminals of said connector member at one end and are connected to respective terminals of the housing side member at the other end; and a guide axis that extends in a direction in which said connector member faces said housing side member, extending through said housing side member and guiding said connector member in a direction of vertical extension thereof in such a manner that said connector member is capable of being displaced with respect to said guide axis, said guide axis further protruding through said connector member and said housing member and providing horizontal support for the connection and disconnection of said electric unit.

2. The connector according to claim 1, wherein the housing side member is a printed circuit board fixed to the housing.

3. A connector, comprising:

a first connector portion removably connected to an electric unit;

a second connector portion disposed on a printed circuit board;

a resilient member that produces a strong resilient force in the vertical direction and a weaker resilient force in the horizontal direction which supports said first connector portion over said second connector portion with a space therebetween;

a plurality of electrical connection pins which have middle portions for allowing relative displacement of said first and said second connector portions and respectively form terminals of said first and second connector portions at either end; and a guide axis that extends in a direction in which said first connector portion faces said second connector portion, extending through said second connector portion and said printed circuit board and guiding said first connector portion in a direction of vertical extension thereof in such a manner that said first connector portion is capable of being displaced with respect to said guide axis, said guide axis further protruding through said first connector and said second connector and providing horizontal support for the connection and disconnection of said electric unit.

4. The connector according to claim 3, wherein the middle portion of said electric connection pin is a resilient deformed portion serving also as said resilient member.

5. The connector according to claim 4, wherein said electric connection pin is composed of a metal plate, the metal plate has a curved portion bent in a thickness direction, and the curved portion serves as a resilient deformed portion.

6. The connector according to claim 5, wherein each of said first and second connector portions has a plurality of terminals arranged in two rows, said first connector portion has the terminals in one row and terminals in the other row aligned in a column direction, and said second connector portion has terminals in one row and the terminals in the other rows displaced from each other in a column direction by about a half pitch, where a distance between two terminals in each row is defined as one pitch, wherein said electric connection pins include first electric connection pins which form the terminals in one row of said first connector portion and the terminals in one row of said second connector portion and second electric connection pins which form the terminals in the other row of said first connector portion and the terminals in the other row of said second connector portion, and wherein the middle portions of said first and second electric connection pins are displaced with respect to the positions of the terminals of said first connector portion by about a quarter of the pitch in the opposite directions along the rows of terminals.

7. The connector according to claim 6, wherein the curved portion of said first electric connection pin and the curved portion of said second electric connection pin are displaced from each other in a direction in which the electric unit is removably attached to said first connector portion.

8. The connector according to claim 3, wherein said guide axis has an end part which protrudes from said first connector portion and fits into a predetermined hole in a guide rail, which end part guides the electric unit toward said first connector portion to position the guide rail and said first connector portion.

9. The connector according to claim 3, wherein said guide axis has an end part which protrudes from said first connector portion and fits into a predetermined grove in a guide rail, which end part guides the electric unit toward said first connector portion to position the guide rail and said first connector portion.

10. The connector according to claim 3, wherein the electric unit is a hard disk unit disposed in the housing shared with said connector unit.

11. The connector according to claim 10, wherein the hard disk unit is one that is removably installed in a portable computer, and said second connector portion is a printed circuit board fixed in the housing of the portable computer.

* * * * *